United States Patent Office 2,908,800
Patented Oct. 13, 1959

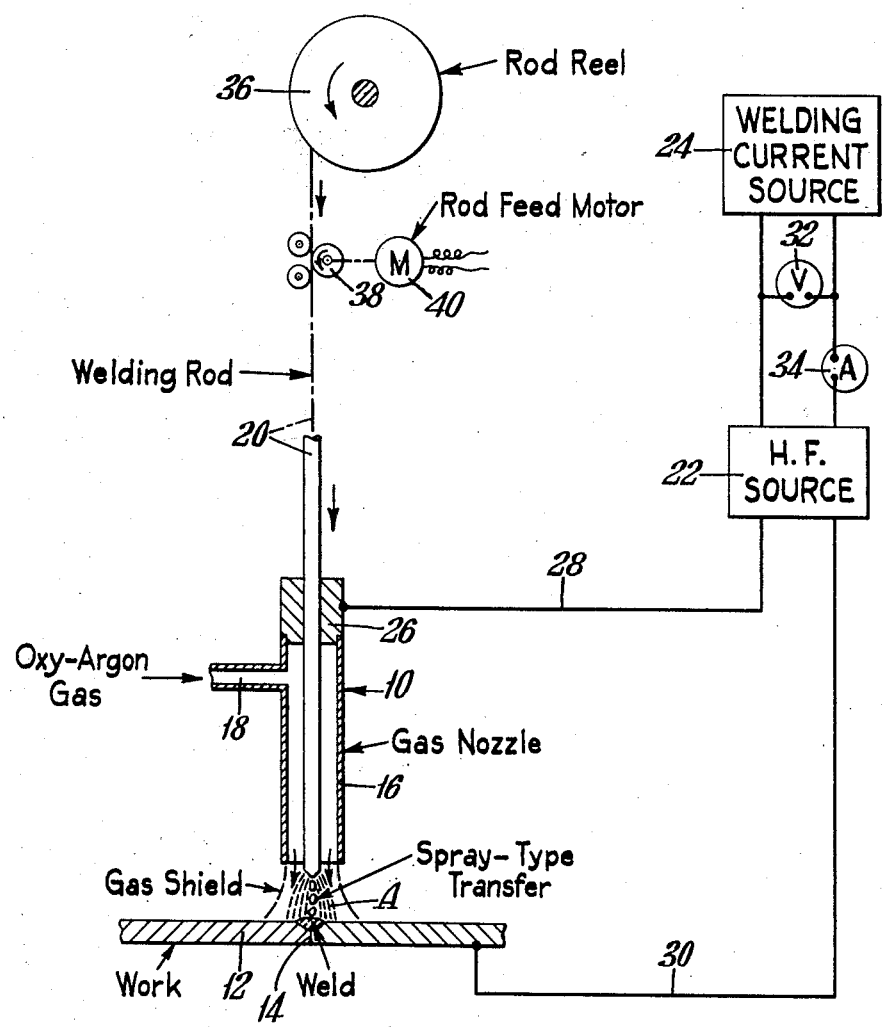

2,908,800

METAL ARC WELDING

Rudolph Thomas Breymeier, Oak Ridge, Tenn., assignor to Union Carbide Corporation, a corporation of New York Application March 15, 1955, Serial No. 494,320

4 Claims. (Cl. 219—74)

This invention relates to consumable electrode metal arc welding and more particularly to sigma (shielded-inert-gas-metal-arc) welding.

The present application is a continuation-in-part of my application Serial No. 210,397, filed February 10, 1951, in which improved direct current sigma welding is accomplished with an arc shielding gas that is composed of a mixture of argon and oxygen, now referred to an oxyargon or sigma grade argon.

According to the present invention a new and unexpected result is achieved in alternating current sigma welding by the combined use of oxy-argon as the arc shielding gas and superimposed high-frequency current on the arc, which combination is effective to produce a spray type transfer of electrode metal at a lower alternating current level than that which was possible prior to the invention, along with stable operation and improved weld contour.

With only argon as the shielding gas in superimposed high-frequency high-potential current on low (commercial) frequency A.C. sigma welding, there was either no metal transfer during the straight polarity half-cycle of the welding A.C. below a certain relatively high current level, or such transfer was in the form of one large globule of molten metal during such half-cycle. With the addition of oxygen to the argon gas shield in accordance with present invention, however, the metal transfer even below such current level is in the form of rapid drops, similar to that existing is known D.C.-reverse polarity sigma welding, thus improving the operation and the resulting weld bead.

In the drawing:

The single figure is a circuit diagram illustrating the invention.

As shown in such diagram a sigma welding gun 10 is arranged above work 12 to be welded along a seam 14. Such gun 10 comprises a gas cup or nozzle 16 into which a regulated stream of oxy-argon gas is delivered through an arc-shielding gas inlet 18 from any suitable source of supply. Such stream of oxy-argon gas flows around a welding rod or wire 20 of fusible metal that passes axially through the nozzle, both gas and wire being discharged from the lower, open end of the nozzle in use. The work 12 and wire 20 are connected to a source 22 of high-frequency potential and to an A.C. welding current source 24 by suitable circuit means including a rod-contact tube 26, and leads 28 and 30; a voltmeter 32, and an ammeter 34 being connected to such circuit to indicate the welding voltage and current, respectively. The wire or rod 20 is drawn from a reel 36 and fed to the gun 10 by a wire feed roll 38 that is driven by a rod feed motor 40.

In operation an arc A is struck between the lower end of the wire 20 and the work 12 above the seam 14 and, as the adjacent work metal and lower end of the work and wire fuse due to the flow of welding current in such arc, the welding wire is fed toward such seam 14 and the gun 10 is moved in the direction of the seam, butt welding the work 12. The fused metal of the wire 20 is effected by a spray-type transfer that is by virtue of the continuous oxy-argon gas-shield that flows from the nozzle 16 in an annular stream around the arc A and over the adjacent parts of the work 12, at a lower current level than is possible with an arc-gas shield of argon that is essentially free of oxygen.

As an example of the invention a conventional 60 cycle-A.C. welding transformer and a high-frequency source were used to sigma weld a bead on ⅜" mild steel plate with $\frac{1}{16}$" steel welding wire electrode and 5% oxy-argon (5% oxygen and 95% argon) gas to shield the arc. The combination of the superimposed high frequency current and the oxy-argon arc-shielding gas with A.C. in sigma welding produced a beneficial effect that was entirely unexpected in that a spray-type transfer occurred at relatively lower welding current values than was possible with argon alone, i.e. argon that was free of oxygen.

The addition of oxygen to argon, according to the invention, lowers the current level at which the metal transfer progresses from a globule-like deposit to a spray of fine droplets. This effect is almost identical to that which occurs in D.C.-S.P. sigma welding and is probably the reflection of the results obtained by welding by such means. Also, the oxygen addition improves the general welding action and the quality of the weld.

Welds made in accordance with the present invention derived the welding current and high-frequency from either of the following sources:

(1) A Westinghouse, 60-cycle, A.C., 1000-ampere welding transformer, in which case the high-frequency source was Mid-States Type, 110 volts primary, 300 amperes capacity secondary; or (2) A Miller, 60-cycle, A.C., 400-ampere welding transformer, which had a built-in high-frequency source.

In the following table of sigma welds made with superimposed high-frequency, the $\frac{1}{16}$-inch diameter welding wire was either CMS steel, or where stainless steel wire was used, Type 304, or No. 60. The welds were made on either Type 347 stainless steel or on mild steel plate. A No. 4 (¼-inch) elongated gas cup (nozzle) was employed and this was positioned approximately one quarter inch above the work. The gas was fed at a rate of between 60 to 70 cubic feet per hour. Welding (traverse) speed was 30 inches per minute.

| Weld No. | Material | Shielding Gas | A.C., Amperes | Wire Speed (in./Minute) | Metal Transfer |
| --- | --- | --- | --- | --- | --- |
| 1 | Mild Steel | Argon | 200 | 134 | Slow drops. |
| 1a | do | do | 225 | 184 | Transition. |
| 2 | do | do | 300 | 200 | Rapid drop to spray. |
| 3 | do | do | 390 | 286 | Spray. |
| 4 | do | Oxy-Argon 5% | 150 | 88 | Slow drop. |
| 5 | do | do | 200 | 124 | Transition. |
| 5a | do | do | 225 | 184 | Spray. |
| 6 | do | do | 315 | 210 | Do. |
| 7 | do | do | 500 | 500 | Do. |
| 8 | Stainless | Argon | 300 | 230 | Do. |
| 8a | do | do | 230 | 184 | Transition. |
| 9 | do | do | 210 | 130 | Slow drop. |
| 10 | do | do | 420 | 350 | Spray. |
| 11 | do | Oxy-Argon 5% | 210 | 130 | Slow drop—transition. |
| 11a | do | do | 225 | 184 | Spray. |
| 12 | do | do | 295 | 196 | Do. |
| 13 | do | do | 515 | 400 | Do. |

A series of welds in accordance with the invention made to determine the transition currents at which the transfer of metal changed from drops to spray, indicated that lowest amperages at which the metal transfer altered to a spray were 225 and 200 when welding mild steel in argon and oxy-argon, respectively, and 230 and 208 when welding stainless steel with an argon and oxy-argon gas shield, respectively.

Although the degree to which the transition current is lowered is not large, it indicates a definite reduction in the current required. More important, however, are the arc stability and the improved weld appearance which result from the present welding practice, and these characteristics are well-defined.

As to the frequency range of the superimposed high-frequency a low range of about 2 megacycles is estimated as workable, with an upper range of the order of 6 megacycles. With a 240 cycle A.C. welding power source, superimposed high-frequency was found necessary to stabilize and maintain the arc.

Although only mild steel and stainless steel have been welded in the present manner, the process is believed to be applicable to most other metals with the exception of those reactive metals which might form refractory oxides.

The percentage of oxygen that is mixed with argon according to the invention ranges from a very small amount, as one-tenth of one percent oxygen in the case of highly refractory metals, such as titanium and magnesium, to upwards of 20%–50% in the case of rimmed steels where the speed of welding is more important than weld quality. Obviously another inert gas such as helium might be substituted for or combined with argon without departing from the invention.

The following are the compositions of the various types of material referred to above:

*Welding rods*

*C.M.S.*—C.M.S. refers to the alloys in this rod, viz. chromium, manganese, and silicon. Composition is medium carbon steel containing less than 2% total of such alloys.

*Type 304.*—This is a specification set up by the American Iron and Steel Institute for an alloy of the following composition: C 0.08 max., Mn 2.00 max., Si 1.00 max., Cr 18.00–20.00, Ni 8.00–11.00, P 0.04 max., S 0.03 max.

*Type 347.*—Also American Iron and Steel Institute specification for an alloy of: C 0.08 max., Mn 2.00 max., Si 1.00 max., Cr 17.00–19.00, Ni 9.00–12.00, Cb 10 x C minimum, P 0.04 max., S. 0.03 max.

*No. 60.*—This is a welding rod with specifications similar to Type 347 but with slight modifications in the composition which insure satisfactory welding properties.

I claim:
1. Metal arc welding process which comprises the steps of discharging a stream of oxy-argon gas containing 0.10–50.00% oxygen toward a welding site on a selected base metal, striking an arc between the end of a wire electrode and such site, energizing such arc with commercial low frequency alternating current welding power and a superimposed high-frequency potential of 2 to 6 megacycles, shielding the arc with such stream, and feeding the wire electrode toward the arc at a regulated speed, producing a continuous spray-type transfer of electrode metal in such arc with well-defined arc stability.

2. Metal arc welding process as defined by claim 1, in which the base metal and wire electrode are composed of steel selected from the class consisting of carbon steel and stainless steel, and the stream of oxy-argon gas is composed of 5% oxygen and 95% argon.

3. Metal arc welding as defined by claim 1, in which the base metal and wire electrode are metal selected from the class consisting of magnesium and titanium, and the stream of oxy-argon gas is composed of 0.1% oxygen and 99.9% argon.

4. Metal arc welding as defined by claim 1, in which the base metal and wire electrode are composed of rimmed steel, and the stream of oxy-argon gas is composed of 20%–50% oxygen and the balance argon.

References Cited in the file of this patent
UNITED STATES PATENTS

| | | |
|---|---|---|
| 2,423,515 | Morris | July 8, 1947 |
| 2,475,357 | Miller | July 5, 1949 |
| 2,504,868 | Muller | Apr. 18, 1950 |
| 2,516,016 | Pakala | July 18, 1950 |
| 2,516,037 | Williams | July 18, 1950 |
| 2,599,281 | Potter | June 3, 1952 |
| 2,612,582 | Appleton | Sept. 30, 1952 |
| 2,620,422 | Volff | Dec. 2, 1952 |
| 2,694,763 | Muller | Nov. 16, 1954 |

FOREIGN PATENTS

| | | |
|---|---|---|
| 1,051,528 | France | Sept. 16, 1953 |

OTHER REFERENCES

Physical Review, Apr. 1, 1932, volume 40, pp. 36–39, "Arc Discharge Not Obtained in Pure Argon Gas."

Journal Amer. Weld. Soc., Weld. Research Suppl., October 1938, p. 64.